May 23, 1961
C. A. NESS
2,985,068
NEGATIVE CARRIER
Filed Aug. 12, 1958
4 Sheets-Sheet 3
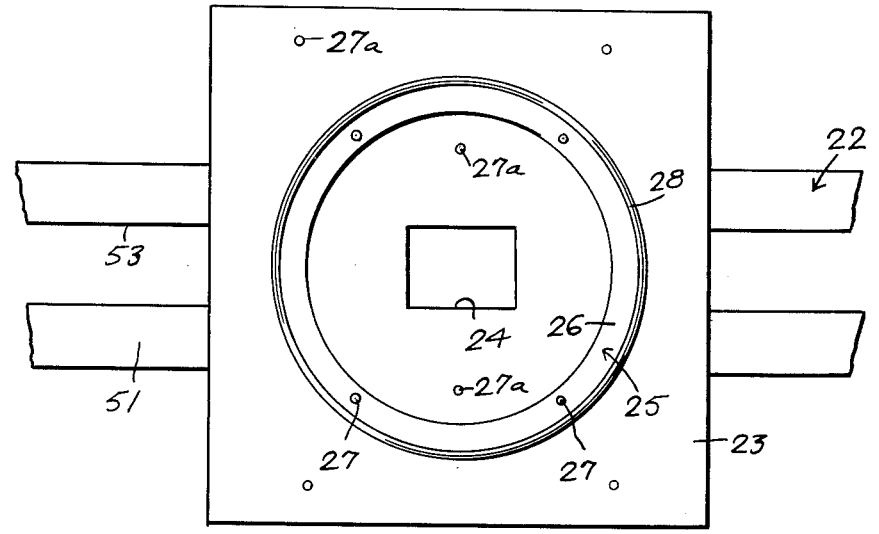
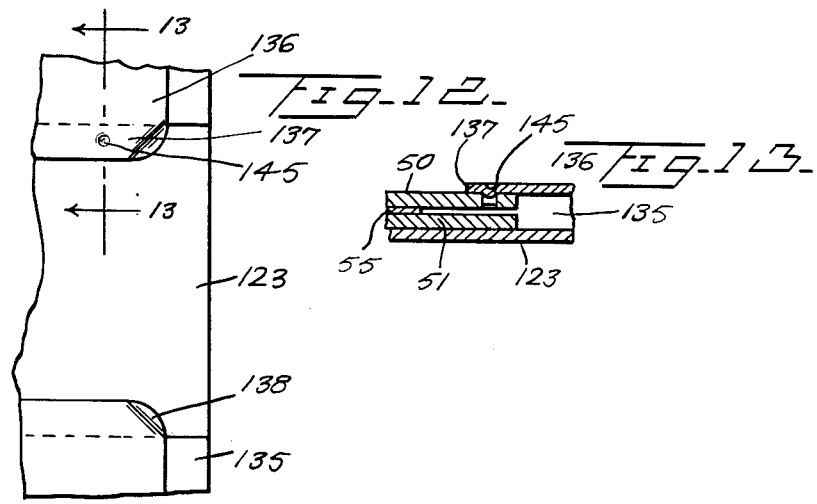
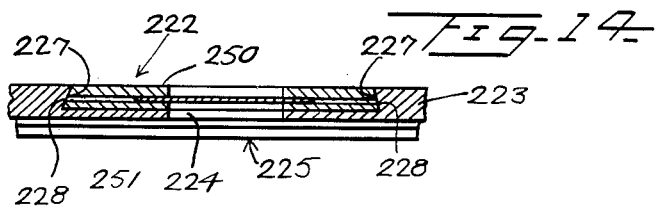
Carl.A.Ness
INVENTOR
BY CASnow+Geo.
ATTORNEYS.

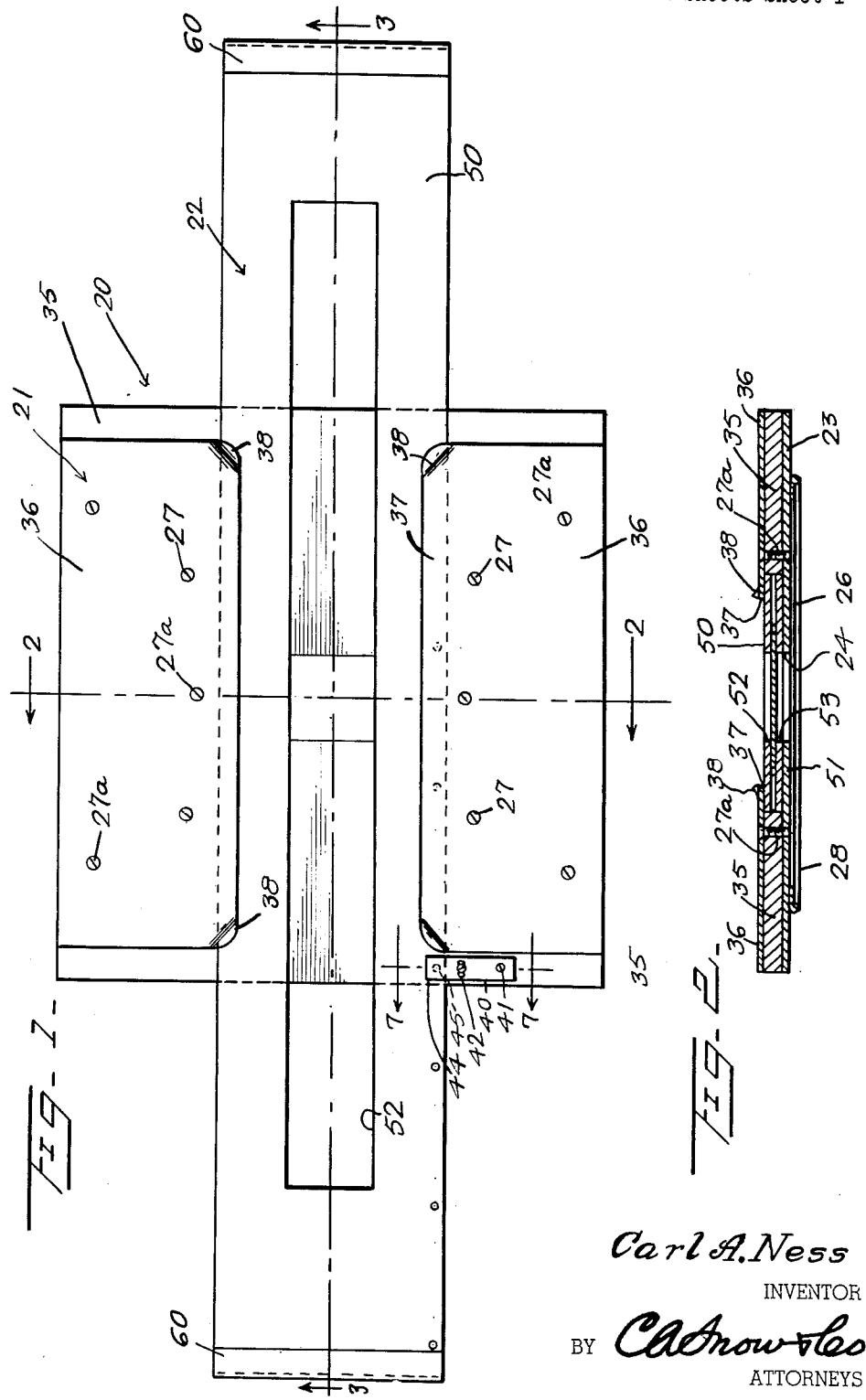

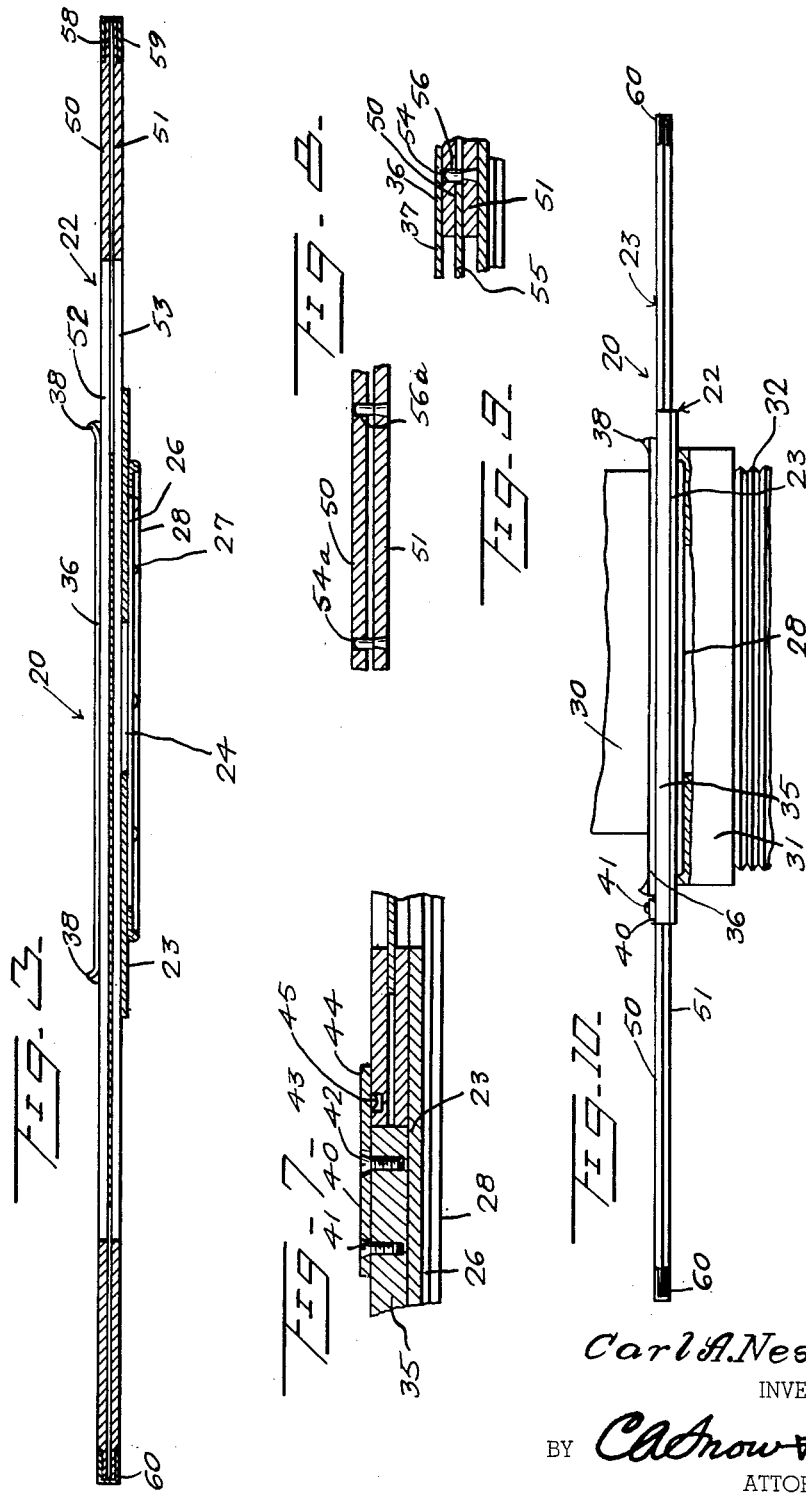

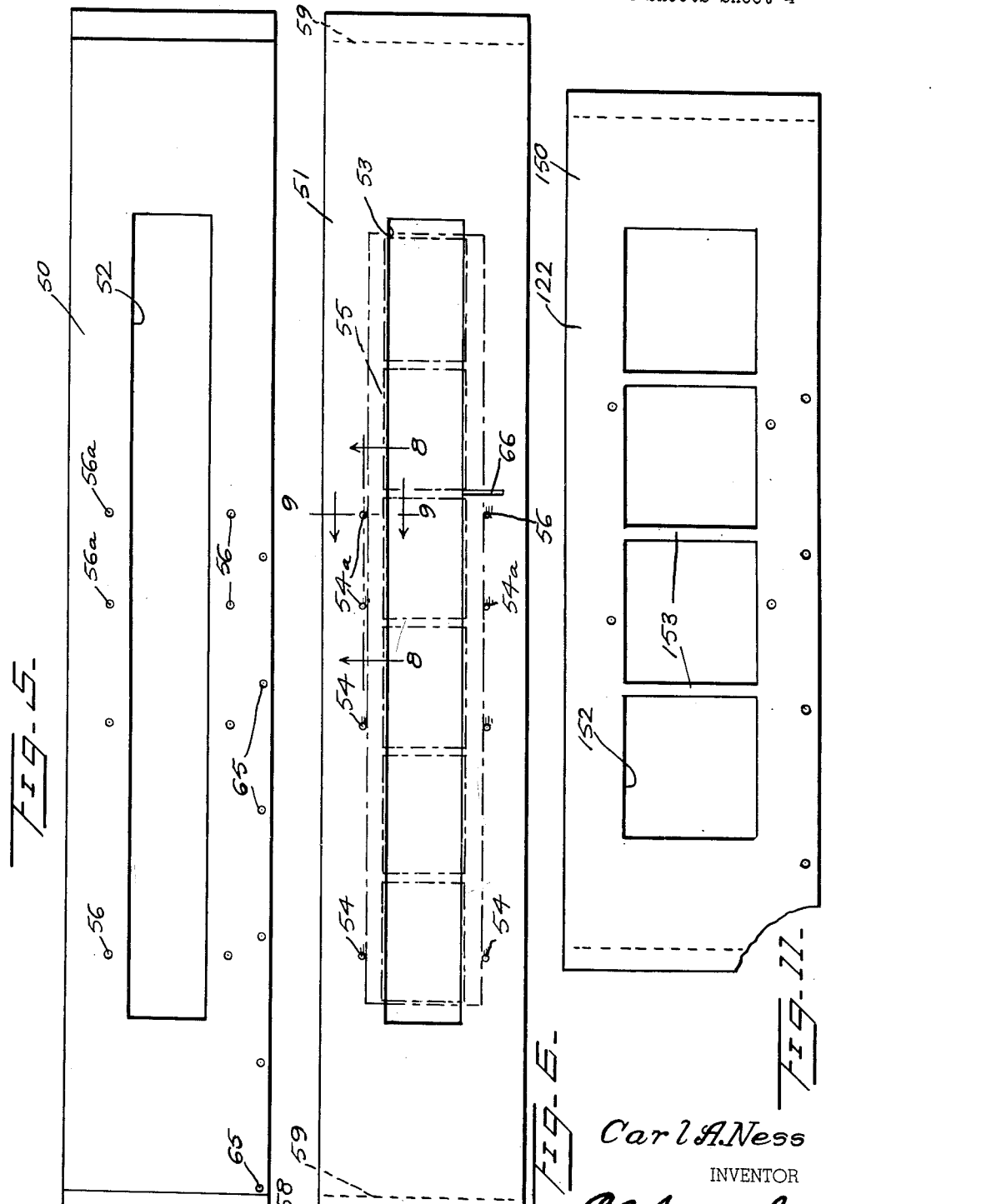

United States Patent Office 2,985,068
Patented May 23, 1961

2,985,068

NEGATIVE CARRIER

Carl A. Ness, 18 Grandin Circle, Rockville, Md.

Filed Aug. 12, 1958, Ser. No. 754,681

3 Claims. (Cl. 88—24)

This invention relates to a negative carrier or film holder, and has particular application to such a negative carrier adapted for use with a photographic enlarger.

A primary object of this invention is the provision of a negative carrier which is adapted to be located between the condenser and the bellows assembly, for example, of a conventional photographic enlarger, provided with means whereby a plurality of negatives, on a single film strip, or separately, may be sequentially exposed for enlargement purposes, without the necessity of opening the negative carrier or film holder, or consequent movement of the condenser or other related parts to provide access to the negative holder.

An additional important object of the invention is the provision of a device of this character which may be readily adapted for the reception of the film strip, and which is provided with means for the proper alignment of the negative or film between the light source, or the condenser and the lens for proper alignment and positioning of the projected image.

An additional object of the invention is the provision of means to protect the negative from coming in contact with any part of the negative holder except at the non-exposed edges thereof, thus eliminating any scratches to the negative when shifting across the negative holder frame from one negative to another.

A further object of the invention is the provision of means for supporting a negative which eliminates scratches due to dirt on the surface on the sides of the negative opening, of plate type or glass negative holders when the plates are pressed together.

An additional object of the invention is the provision of a device whereby dust, grit or lint may be brushed or blown away from the series of negatives while they are in the negative holder in one operation.

A further object of the invention is the provision of such a device whereby a film containing a series of negatives may be sprayed or brushed with scratch eliminator fluid or other similar fluids simultaneously, thus expediting the spraying operation, and eliminating the adherence of the fluid to the surface of the negative holder, which is particularly disadvantageous when shifting from one negative to the next in conventional holders.

A further important object of the invention is the provision of such a carrier provided with a slide member, which may be moved to position adjacent or selected negatives for enlargement purposes individually.

A more specific object of the invention is the provision of such a device having means including a detent member whereby the negatives may be moved step by step so that when the detent engages each subsequent negative will be properly aligned, without the necessity for individual adjustment.

Still another object of the invention is the provision of a device of this character which is provided with a separable slide negative carrier member, having means therein for securing the upper and lower portions in proper alignment, the means comprising pins which are spaced apart to provide guides for the films positioned therein.

A further specific object of the invention is the provision of such a device characterized by spring clips at the ends of the film carrier slide for holding the parts in related assembly during operation.

A still further important object of the invention is the provision of a device of this character wherein a plurality of negatives may be sequentially exposed without the necessity of adjustment of the apparatus other than the movement of the negative carrier slide, thus saving materially in time and labor in the enlargement of photographic films.

Still other objects reside in the combinations of elements, arrangements of parts and features of construction, all as well be more fully pointed out hereinafter and shown in the accompanying drawings, wherein there are disclosed preferred embodiments of this inventive concept.

In the drawings:

Figure 1 is a top plan view of the negative carrier of the instant invention, showing the supporting member and the slide therefor, the latter being positioned centrally.

Figure 2 is a sectional view taken substantially along the line 2—2 of Figure 1 as viewed in the direction indicated by the arrows.

Figure 3 is a sectional view taken substantially along the line 3—3 of Figure 1 as viewed in the direction indicated by the arrows.

Figure 4 is a bottom plan view of the negative carrier frame member, showing the slide in position therein, parts of the latter being broken away.

Figure 5 is a top plan view of the upper plate of the negative carrier slide.

Figure 6 is a top plan view of the bottom plate of the negative carrier slide.

Figure 7 is an enlarged sectional view taken substantially along the line 7—7 of Figure 1 as viewed in the direction indicated by the arrows.

Figure 8 is an enlarged sectional view taken substantially along the line 8—8 of Figure 6, but showing the top plate in position thereon.

Figure 9 is an enlarged fragmentary sectional view taken substantially along the line 9—9 of Figure 6, but showing the entire unit in assembled position.

Figure 10 is an edge elevational view of the negative carrier showing the slide carrier frame in position in relation to a photographic enlarger, only fragments of the latter being shown.

Figure 11 is a top plan view similar to Figure 5 of a modified form of upper slide section adapted for use with larger films.

Figure 12 is a fragmentary top plan view of a modified form of construction for the negative carrier frame.

Figure 13 is an enlarged sectional view taken substantially along the line 13—13 of Figure 12.

Figure 14 is a fragmentary sectional view taken substantially along the center line of a modified form of negative carrier frame and its associated slide.

Similar reference characters refer to similar parts throughout the several views of the drawings.

Having reference now to the drawings in detail, there is generally indicated at 20 a negative carrier or film holder which is comprised essentially of two main parts, a negative carrier frame generally indicated at 21, and a negative carrier slide 22, which will hereinafter be referred to as the frame and slide respectively.

Having reference first to the frame, the same is generally comprised of a base plate 23, which is provided, as best shown in Figure 4, with a central opening or aperture 24, through which the negative to be enlarged is adapted to be exposed.

The base plate 23 is provided with a mounting ring 25, which includes a flat rim 26, which is secured as by means of rivets or screws 27 to the base plate 23, and a raised annular rim 28, which serves as a mounting flange and is adapted to fit in the central opening of the conventional bellows frame of a photographic enlarger.

Figure 10 discloses the negative carrier 20 with the frame 22 positioned between the condenser 30 and the bellows holder 31 of a conventional enlarger, the bellows being fragmentarily illustrated at 32, for the purpose of showing the position and location of the carrier.

As better shown in Figures 2 and 3, a pair of spaced apart guide plates 35 are mounted on the base plate 23, the plates 35 having internal parallel side walls, which form a transversely extending guide channel for the slide 22. Plates 36 are positioned on top of the guide plates 35, and overlie the edges of the same to form flanges 37, which serve to hold the slide 22 against displacement. The screws or rivets 27 extend entirely through the flange 26, the base plate 23, the guide plates 35 and the flange plates 36, and serve to hold the component parts of the negative carrier frame in related assembly. If desired, additional screws or rivets 27a may be provided at suitable locations for holding the base, the guide plates and the flange plates more securely together.

As best shown in Figures 2 and 3 the corners of the overlying flanges 37 are upwardly turned at 38, to facilitate the insertion of the slide into its associated channel. The upturn may be relatively slight, and is purposely exaggerated in the drawings for the sake of illustration.

The ends of the guide plates 35 project slightly beyond the ends of flange plates 36, and on one such projecting end portion, there is positioned a resilient leaf member 40, which is fixedly secured to the top of plate 35 by means of a screw 41, a second screw 42 being provided which extends through a transversely elongated slot, in the member 40, for the purpose of minute pivotal adjustment about the screw 41, for aligning purposes as will be more fully described hereinafter. A portion 44 of the spring member 40 overlies the channel formed between the plates 35, and terminates at a point substantially in alignment with the outer edge of the flange 37. The portion 44 carries on its under side a ball detent 45, the purpose of which will be more fully described hereinafter.

Having reference now to the negative carrier slide 22 the same is comprised of an upper slide section 50 and a lower slide section 51, each of which is provided with an elongated central aperture 52 and 53 respectively of a width substantially equal to the exposed area of a particular size of film, and of a length corresponding to the length of the film strip carrying any desired number of negatives, as shown in the illustrative example, 6 (see Fig. 6).

The lower slide section 51 carries a plurality of spaced apart guide and aligning pins 54 spaced at suitable intervals along opposite sides of the opening 53, the spacing being as desired, with the exception of a pair of substantially centrally disposed pins 54a, which are positioned apart a distance less than the width of a single negative, in order that if desired, a single negative may be employed with the slide rather than a strip carrying a plurality of negatives. The pins 54 on opposite sides of the lower slide section are positioned apart a distance, as previously mentioned, very slightly in excess of the width of the film strip, in order that they may serve as guides in aligning the film strip 55 on the lower section. The upper slide section carries a plurality of openings 56 and 56a aligned with the pins 54 and 54a, in order that the upper section may lie flush on the lower section when superposed thereon. As best shown in Fig. 3 each end of the top of the upper section 50 and the bottom of the lower section 51 is cut away as at 58 and 59 respectively for the accommodation of a U-shaped spring clip member 60, which serves to hold the sections in related assembly, after a negative strip has been positioned therebetween.

A plurality of spaced recesses 65 are positioned along one edge of the top of upper slide section 50, being spaced apart a distance substantially equal to the width of an individual negative, and are adapted, when the slide 22 is positioned in the carrier between the guide plates 35, to be selectively engaged by the detent 45, in order to provide a suitable indication for the step by step movement of the slide, in aligning the negatives with the opening 24 for the projection of their image in the conventional manner.

In order to properly align the film strips, the top of the lower slide section 51 is provided with a groove 66, which is very shallow, and which extends to a point immediately adjacent the edge of the opening 53, and is suitably spaced relative to the openings 65 so that when the film strip is aligned with a division line thereof aligned with the marker 66, the openings 65 are so spaced that when they are sequentially moved into engagement with the detent 45, the films are successively aligned and squared over the opening 24.

It should here be pointed out that the pins 54 and 54a may be in the form of either screws engaged in suitable threaded apertures in the lower slide section 51, or may be in the form of studs or rivets suitably pressed into corresponding openings in the section 51.

From the foregoing the use and operation of the device should now be readily understandable. The upper and lower sections 50 and 51 are first separated, and a film strip is aligned on the section 51 between the oppositely disposed pins 54, and aligned with the indicating mark 66. The top slide member 50 is then positioned over the lower slide section, so that the pins 54 engage in their associated openings 56, and the spring clips 60 are suitably engaged over the ends of the associated members.

The slide is then inserted in the frame, in aligned position between the guide plates 35, until the first opening 65 is engaged with detent 45, at which time a negative is suitably exposed through the opening 24 for processing. When the enlargement of the first negative is completed, obviously the slide may simply be moved until the next opening 65 is lightly engaged by the detent 45, and the process repeated until such time as the complete strip has been exposed for enlargement or other related purposes.

Obviously the necessity of changing the position of the condenser, and opening the negative carrier for replacement of the film or movement thereof for each individual film of a selected strip is obviated.

In certain instances, as for example, when a larger film is employed, it is necessary to provide lateral bracing in order to prevent buckling or unevenness in the films. With larger films a slide 122 is provided, the top plate 150 of which is disclosed in Figure 11. This plate is provided with a central opening 152 which corresponds in all respects to the opening 52, with the exception of the fact that transversely extending strips 153 are formed integral with the side walls of the opening, and so positioned as to extend over the divisional markings between the films, assuring that the films will be positioned in flat relation, when passing through the slide frame. Obviously a wider frame is necessary for a larger film, but in construction is identical to the modification previously described. The lower plate or section of the slide 122 is substantially identical to the lower section 51, with the exception of the fact that strips corresponding to the strips 153 are also positioned across the elongated opening in the lower slide.

Figure 12 discloses a further modified form of construction, in which a base 123 carries guide plates 135 and flange plates 136 provided with overlying flanges 137 having upwardly turned corners 138. In this modification a depression or detent 145 is impressed in one corner of a flange 137, and performs the same function as the detent 45, in its engagement with the opening 65. This modification while less expensive to manufacture than the previous modification is subject to the minor disadvantage that pivotal lateral adjustment for the purpose of minute adjustment of the alignment of the films is not possible. The slide 22 employed with the modification of Figure 12 may be identical to that previously described, with the exception of the fact that its position is reversed so that the openings 65 will be on the upper side (as seen in Fig. 5) rather than the lower to conform to the positioning of the detent 145.

Figure 14 discloses still another modified form of the invention, wherein the base 23, the guide plates 35 and the flange plates 36 are supplanted by a single block 223. This block is provided with a mounting ring 225, which is substantially identical to the mounting ring 25 previously described, and is cut with an opening 224 centrally positioned therein, and has a single machined transverse groove 226 therein, the edges of which converge inwardly as indicated at 227, to form bevels, the smaller portion being towards the open side of the frame.

A slide member 222 which includes an upper section 250 and a lower section 251 is substantially identical in all respects to the previously described slide member 22 with the exception of the fact that its outer edges are beveled as at 228 to conform to the bevel of the edges 227. In this modification it will be seen that the operation of the device is identical to that of the previously described modifications.

From the foregoing it will now be seen that there is herein provided an improved negative carrier or film holder, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What I claim is:

1. A device for holding a photographic negative film strip, the strip containing a plurality of images from which enlargements are to be made, comprising in combination a frame including a base plate having a central exposure opening, guide plates secured to said base plate, an open channel formed by said guide plates on the upper side of said base plate, a negative film strip carrier slide embodying upper and lower slide sections slidably mounted in said open channel, said slide sections having elongated aligned central openings aligned with said open channel, said openings having lengths corresponding to the length of the film strip positioned between said slide sections, the images adapted to be sequentially aligned with the central exposure opening of said base plate as the slide is moved in said channel, and mechanism for securing the frame between a condenser and bellows of a conventional enlarger.

2. A device for holding photographic film for enlarging purposes, comprising in combination, a negative carrier frame including a base plate having an opening therein, means for mounting said frame on a photographic enlarger, guide means forming an open channel on said frame, a negative carrier slide having a slot extending axially therethrough slidably mounted in said guide means with the slot aligned with the open channel for movement to aligned position with said opening in the base plate and means for mounting a strip of film having a plurality of images thereon on said slide in alignment with the slot, said slide being movable for selectively juxtaposing the images of the film strip to said opening of said base plate for exposing the images of the film strip for enlargement.

3. A structure as claimed in claim 2 wherein said negative carrier slide comprises upper and lower plates, said plates having axial aligned openings forming the slot, the length and width of said openings being equal to the length and width of the strip of film, the strip of film being held between said upper and lower plates for sliding movement into alignment with the opening in the base plate and the lens of an enlarger, successively exposing the images of the strip of film for enlargement.

References Cited in the file of this patent

UNITED STATES PATENTS

| | | |
|---|---|---|
| 2,073,304 | Hopkins | Mar. 9, 1937 |
| 2,251,184 | Bohannon | July 29, 1941 |
| 2,271,530 | Wick | Feb. 3, 1942 |
| 2,385,771 | Bogue | Oct. 2, 1945 |
| 2,418,226 | Haff | Apr. 1, 1947 |
| 2,461,405 | Appling | Feb. 8, 1949 |
| 2,589,680 | Denny | Mar. 18, 1952 |

FOREIGN PATENTS

| | | |
|---|---|---|
| 512,874 | Germany | Nov. 20, 1930 |
| 57,939 | Netherlands | July 15, 1946 |